(12) United States Patent  
Onda

(10) Patent No.: US 6,650,488 B2
(45) Date of Patent: Nov. 18, 2003

(54) LENS DRIVING APPARATUS AND LENS BARREL

(75) Inventor: Kazuhiko Onda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/106,065

(22) Filed: Mar. 27, 2002

(65) Prior Publication Data

US 2002/0141081 A1 Oct. 3, 2002

(30) Foreign Application Priority Data

Mar. 29, 2001 (JP) ........................................ 2001-096244

(51) Int. Cl.⁷ ................................................ G02B 7/02
(52) U.S. Cl. ........................ 359/823; 359/699; 359/706
(58) Field of Search ................................ 359/696, 829, 359/697, 699, 706, 830, 823

(56) References Cited

U.S. PATENT DOCUMENTS

| 5,016,993 A | * | 5/1991 | Akitake ...................... 359/696 |
| 5,377,048 A | * | 12/1994 | Tada et al. .................. 359/823 |
| 5,510,937 A | * | 4/1996 | Mogamiya ................... 359/823 |
| 5,905,598 A | * | 5/1999 | Shimada et al. ............ 359/694 |
| 5,966,248 A | * | 10/1999 | Kurokawa et al. .......... 359/697 |
| 6,501,604 B2 | * | 12/2002 | Onda ........................ 359/696 |
| 2002/0057503 A1 | * | 5/2002 | Imaoka et al. .............. 359/697 |

FOREIGN PATENT DOCUMENTS

| JP | 07-043583 | 2/1995 |
| JP | 2000-194045 | 7/2000 |
| JP | 2000-275494 | 10/2000 |

* cited by examiner

Primary Examiner—Ricky Mack
Assistant Examiner—Brandi N Thomas
(74) Attorney, Agent, or Firm—Leydig, Voit & Mayer, LTD

(57) ABSTRACT

A lens driving apparatus in accordance with the present invention comprises a lead screw rotated by a driving source; a nut plate formed with a female threaded part meshing with a threaded part of the lead screw and adapted to move along the optical axis as the lead screw rotates; a lens holding frame provided to abut against the nut plate while being slidable with respect to a guide shaft extending along the optical axis, for holding a lens; and urging means for urging the lens holding frame against the nut plate. In this lens driving apparatus, the lens holding frame moves along the optical axis as the nut plate provided separately from the lens holding frame moves.

9 Claims, 5 Drawing Sheets

LENS DRIVING APPARATUS AND LENS BARREL

BACKGROUND OF THE INVENTION

1. Field of the Invention

The present invention relates to a lens driving apparatus for moving a lens, specifically a focus lens for adjusting focus, along an optical axis; and a lens barrel comprising such lens driving apparatus.

2. Related Background Art

Japanese Patent Application Laid-Open No. 2000-275494 discloses a lens driving mechanism for moving a lens along its optical axis. This lens driving mechanism comprises a motor having a lead screw extending along the optical axis as a rotary driving shaft; a bridge having a thread hole in mesh with a threaded part of the lead screw; and a lens holding frame, connected to the bridge, for holding the lens. As the lead screw rotates, the bridge moves along the optical axis, whereby the lens holding frame can be moved along the optical axis. The lens holding frame is slidably attached to a guide shaft extending along the optical axis, whereby the lens holding frame is guided so as to move along the optical axis.

Also, Japanese Patent Application Laid-Open No. Hei7-43583 discloses a lens driving apparatus for moving a lens along its optical axis. This lens driving apparatus comprises a motor having a lead screw extending along the optical axis as a rotary driving shaft; a nut in mesh with a threaded part of the lead screw; and a lens holding frame, formed with an accommodating part for accommodating the nut, for holding the lens. As the lead screw rotates, the nut moves along the optical axis, whereby the lens holding frame moves with the nut along the optical axis.

Further, Japanese Patent Application Laid-Open No. 2000-194045 discloses a lens barrel having a plurality of lens cylinders and enabling them to expand/collapse in a multistage fashion between an accommodating position and a use starting position. Disposed within the lens barrel is a lens driving apparatus for moving the lens along its optical axis.

SUMMARY OF THE INVENTION

In such a conventional lens driving mechanism, however, the bridge or nut in mesh with the lead screw and the lens holding frame slidably attached to the guide shaft are connected to each other or accommodated together, thereby substantially being integrated with each other. Therefore, when the axis of the lead screw shifts from the axis of the guide shaft, snagging may occur, thereby generating such inconveniences as malfunctioning, deformation in each member, and shifting of the optical axis. Further, it is problematic in that "rattling" is likely to occur due to the backlash in meshing parts.

Also, in the conventional lens barrels mentioned above, electric control is carried out such that the lens of the lens driving apparatus do not come into contact with other members when the lens cylinders are collapsed to its accommodating positions. Therefore, they are problematic in that the apparatus configuration is complicated, and are inconvenient in that an operation for accommodating them takes time.

Hence, it is an object of the present invention to provide a lens driving apparatus which suppresses the occurrence of inconveniences such as malfunctioning, deformation of members, and shifting of the optical axis.

It is another object of the present invention to provide a lens barrel in which accommodating operation can be carried out without electric control while preventing the lens from coming into contact with other members.

For achieving the above-mentioned object, the lens driving apparatus in accordance with the present invention is a lens driving apparatus for moving a lens along an optical axis, the lens driving apparatus comprising a lead screw rotated by a driving source; a nut plate formed with a threaded part meshing with a threaded part of the lead screw and adapted to move along the optical axis as the lead screw rotates; a lens holding frame for holding the lens, provided so as to abut against the nut plate while being slidable with respect to a guide shaft extending along the optical axis; and urging means for urging the lens holding frame against the nut plate.

According to such a lens driving apparatus, the lens holding frame abuts against the nut plate while being urged against the nut plate by the urging means, thereby moving along the optical axis as the nut plate moves.

Since the urging action caused by the urging means is transmitted to the nut plate byway of the lens holding frame, the nut plate moves by the amount of backlash with respect to the lead screw, thereby being biased.

Preferably, the threaded part of the nut is less than one pitch. As a consequence, even when an error exists in each pitch width of the lead screw, friction/load is restrained from occurring as the lead screw rotates.

Also, forming the threaded part into less than one pitch simplifies the die-cutting step when molding the nut plate.

Further, it contributes to making the whole apparatus smaller.

Preferably, the lens holding frame abuts against the nut plate about the lead screw. When the nut plate meshes with the lead screw, "rattling" occurs due to the backlash therebetween. When the lens holding frame and the nut plate are thus designed so as to abut against each other about the lead screw such that the movement of the nut plate is transmitted to the lens holding frame by way of the abutting part, the influence of "rattling" can be reduced.

Preferably, the nut plate has a through hole through which the guide shaft penetrates. This can prevent the nut plate from rotating together with the lead screw as the lead screw rotates.

Preferably, the through hole is a slot. Such structure absorbs the deviation between the axis of the lead screw and the axis of the guide shaft, thereby preventing malfunctions from occurring due to axial misalignment.

The lens may be a focus lens for adjusting focus in a taking optical system.

The lens barrel in accordance with the present invention comprises moving means for moving the above-mentioned lens driving apparatus to an accommodating position along the optical axis; and separating means for separating the lens holding frame from the nut plate at a predetermined position by abutting against the lens holding frame when the lens driving apparatus is moved by the moving means to the accommodating position.

In such a lens barrel, in an accommodating operation of the lens driving apparatus, the separating means separates the lens holding frame from the nut plate by abutting against the lens holding frame, so that the lens can be stopped at a predetermined position, whereby collisions with other members can be prevented from occurring.

Examples of separating means include a boss, disposed at the accommodating position of the lens barrel, projecting by a predetermined amount along the optical axis; and a boss, disposed in the lens holding frame, projecting by a predetermined amount along the optical axis.

DESCRIPTION OF THE PREFERRED EMBODIMENTS

In the following, the lens driving apparatus in accordance with embodiments of the present invention will be explained with reference to the drawings. In the following explanation, parts identical or equivalent to each other will be referred to with numerals or letters identical to each other without repeating their overlapping descriptions.

Figure 1:
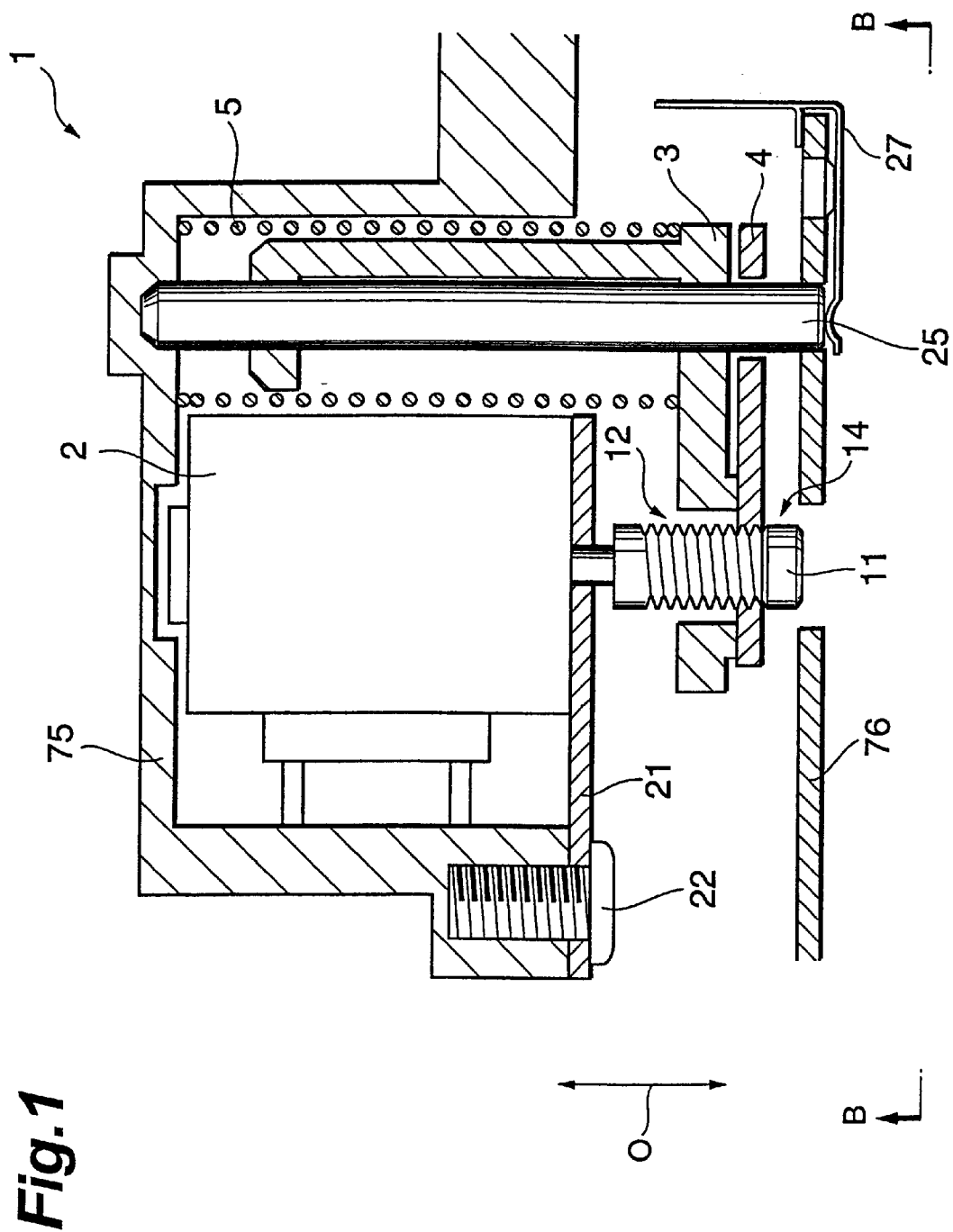
FIG. 1 is a sectional view of the lens driving apparatus in accordance with an embodiment.
Figure 2:
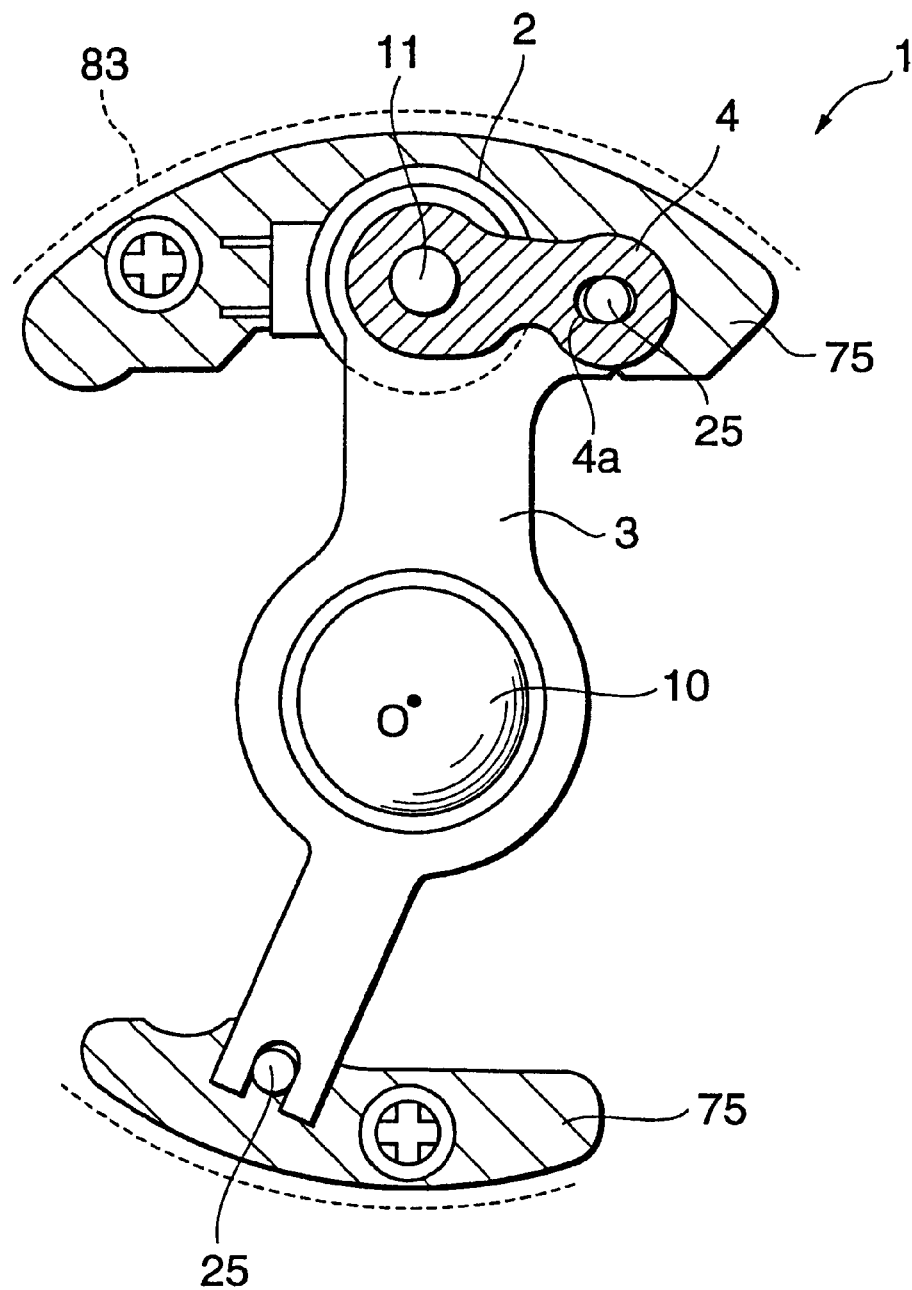
FIG. 2 is a front view of the lens driving apparatus seen in the direction B in FIG. 1.

FIG. 1 is a sectional view of the lens driving apparatus in accordance with an embodiment. FIG. 2 is a front view of the lens driving apparatus seen in the direction B in FIG. 1 (wider than the range of B shown in FIG. 1). This lens driving apparatus 1 is one for moving a focus lens 10, which adjusts focus in a taking optical system, along the optical axis O. The lens driving apparatus 1 comprises a focus motor 2 as a driving source, a nut plate 4 which moves along the optical axis O as being driven by the focus motor 2, and a lens holding frame 3 for holding the focus lens 10 and moving along the optical axis O as the nut plate 4 moves.

The focus motor 2 is fastened to a second lens group frame 75 (explained later) with a screw 22 byway of a holding plate 21. This yields a structure by which the position of focus motor 2 is hard to move when it is driven.

The focus motor 2 has a lead screw 11 which extends along the optical axis O. The nut plate 4 has a female threaded part 14 in mesh with a threaded part 12 of the lead screw 11 with a predetermined amount of backlash. Since the nut plate 4 is in mesh with the lead screw 11 while having a predetermined amount of backlash, fluctuations of the nut plate 4 and lead screw 11 as products are absorbed, whereby inconveniences such as snagging generated in the meshed state making them unmovable are prevented from occurring. Here, the female threaded part 14 is not always required to have an annular form, but can be formed like letter U, for example, as long as it can mesh with the lead screw 11.

The female threaded part 14 of the nut plate 4 is set to less than one pitch. This reduces the part meshing with the threaded part 12 of the lead screw 11, which makes it easier to absorb fluctuations among products, whereby friction/load is less likely to occur due to an error (if any) in each pitch width of the threaded part 12 of the lead screw 11. Further, configuring it into less than one pitch makes it unnecessary to pull dies while rotating them in the die-cutting step at the time of molding the nut plate 4, thereby being advantageous in that the manufacturing step is simplified and in that the lens driving apparatus 1 can reduce its size.

The lens holding frame 3 abuts against the nut plate 4 about the lead screw 11. The lens holding frame 3 is urged by a compression spring 5, acting as urging means, against the nut plate 4 along the optical axis O. As a consequence, the lens holding frame 3 keeps its state abutting against the nut plate 4, whereby the lens holding frame 3 moves along the optical axis O together with the nut plate 4 when the latter moves along the optical axis O (while a guide shaft 25 is disposed between the second lens group frame 75 and a stopper plate 76). The lens holding frame 3 moves along the optical axis O more accurately, since it is placed slidable with respect to the guide shaft 25 extending along the optical axis O. The guide shaft 25 is biased along the optical axis O by a fastening spring 27, so as to be prevented from moving by itself along the optical axis O.

As can also be seen from the drawing, the lens holding frame 3 and the nut plate 4 are provided separately from each other. The lens holding frame 3 moves along the optical axis O being guided by the guide shaft 25, while being pressed against the nut plate 4 and thereby receiving moving action of the nut plate 4, instead of the lens holding frame 3 and nut plate 4 being integrally attached to each other or the lens holding frame 3 meshing with the lead screw 11 and directly receiving the rotary driving force of the lead screw 11. Therefore, even when the axis of the lead screw 11 shifts from the optical axis O, inconveniences such as malfunctioning, deformation of each member, and deterioration of optical performances can be prevented from occurring.

When the nut plate 4 meshes with the lead screw 11, "rattling" occurs due to the backlash therebetween. In this embodiment, the urging action caused by the compression spring 5 presses the nut plate 4 by way of the lens holding frame 3, whereby the nut plate 4 moves by the amount of backlash with respect to the lead screw 11, so as to be biased. This suppresses the occurrence of "rattling" in the nut plate 4, thereby improving the positioning accuracy of the lens holding frame 3. Also, the lens holding frame 3 is less susceptible to influences of "rattling" and "tilts" of the nut plate 4 resulting from the backlash, since it is designed so as to abut against the nut plate 4 about the lead screw 11.

The nut plate 4 is formed with a through hole 4a through which the guide shaft 25 penetrates. This prevents the nut plate 4 from rotating together with the lead screw 11 as the latter rotates. Here, the through hole 4a is formed like a slot. This absorbs the deviation between the axis of lead screw 11 and the axis of guide shaft 25, whereby malfunctions and the like are prevented from occurring due to axial misalignment.

Figure 3:
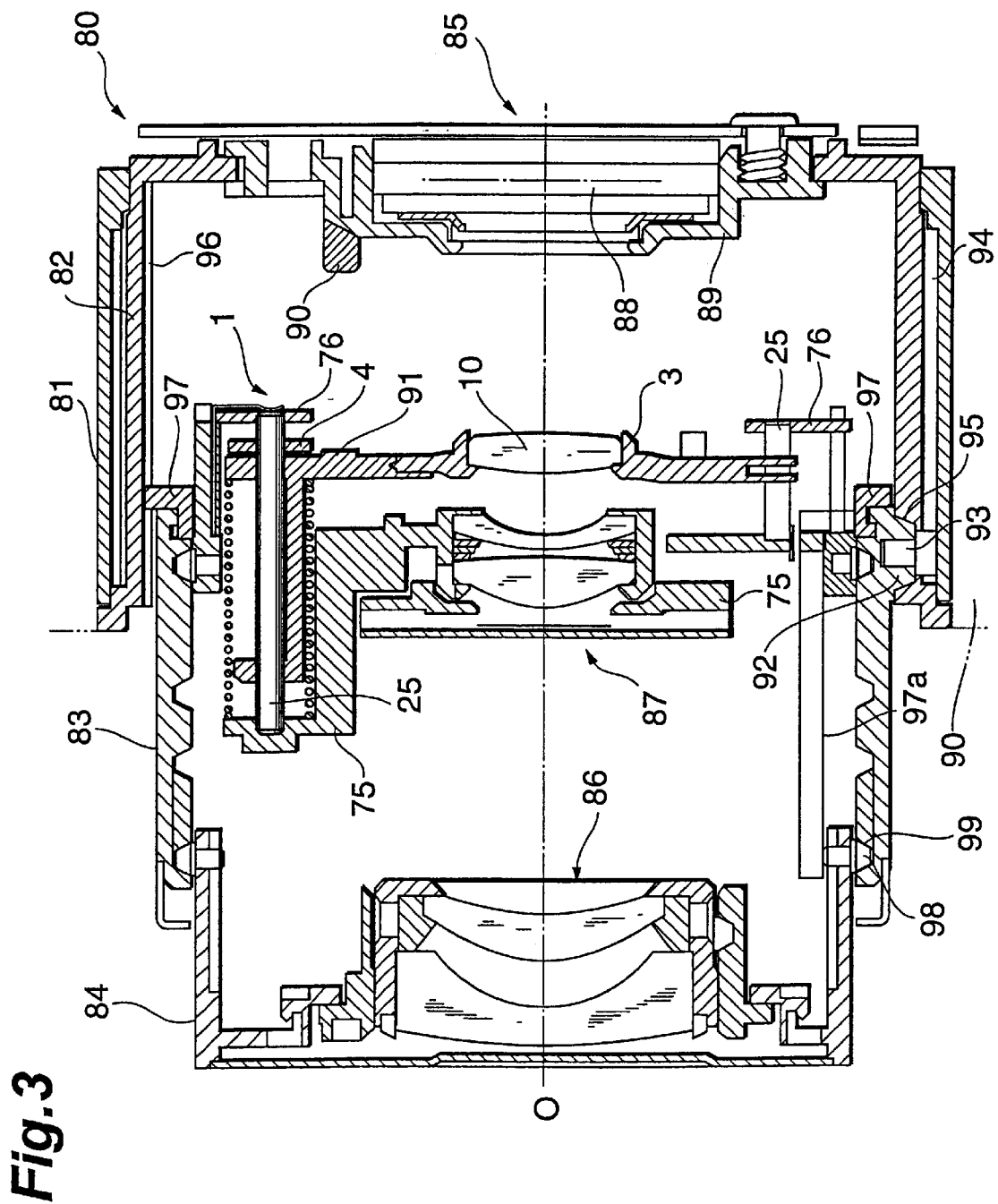
FIG. 3 is a sectional view of a lens barrel in which the lens driving apparatus in accordance with the embodiment is incorporated.
Figure 4:
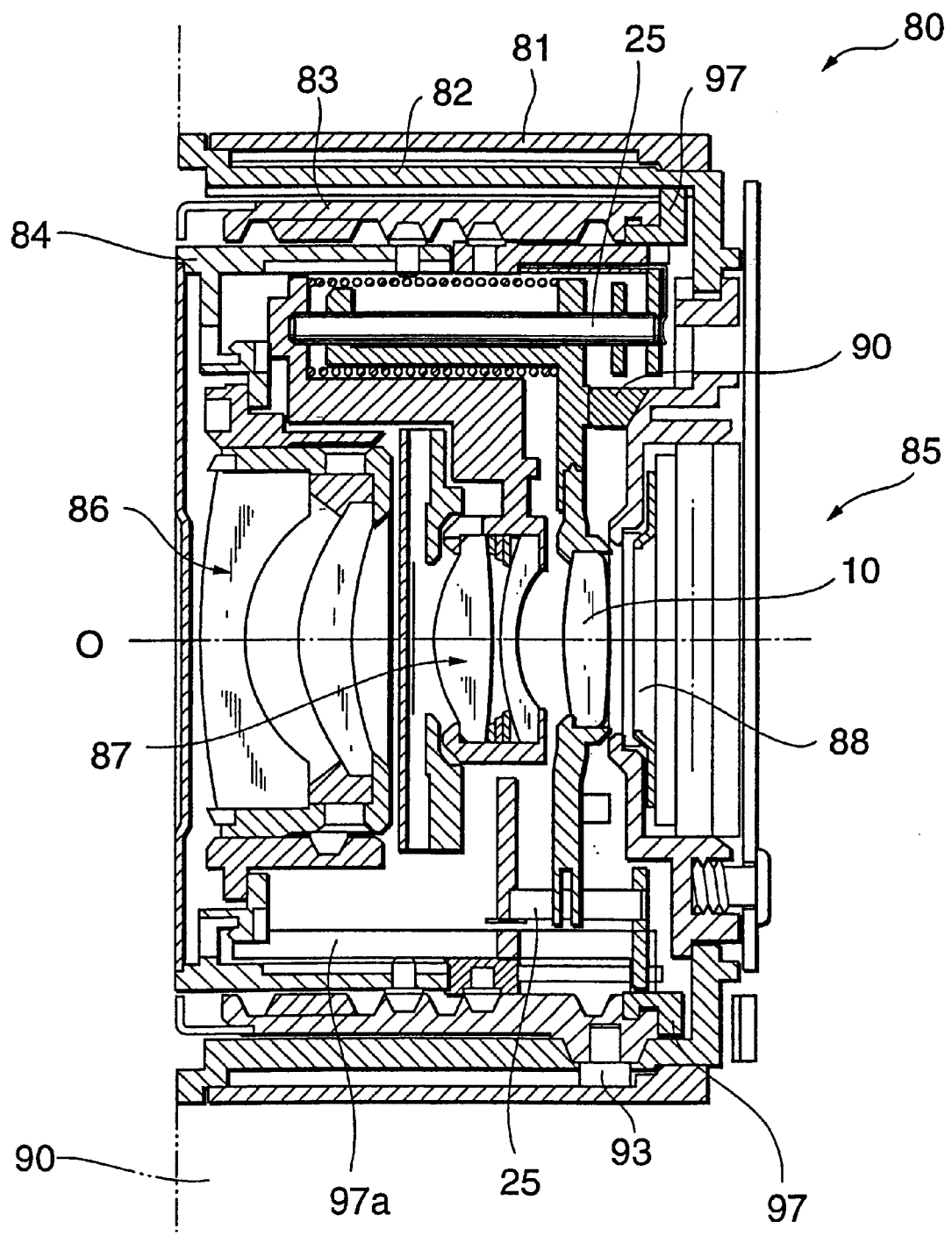
FIG. 4 is a sectional view of the lens barrel in which the lens driving apparatus in accordance with the embodiment is incorporated.

FIGS. 3 and 4 are sectional view of a lens barrel in which the lens driving apparatus in accordance with this embodiment is incorporated. FIG. 3 shows a state where an intermediate cylinder 83 and a movable cylinder 84 are expanded. FIG. 4 shows a state where the intermediate cylinder 83 and the movable cylinder 84 are collapsed. The lens barrel 80 in accordance with this embodiment is used in a taking optical system of a digital camera. The lens barrel 80 comprises a rotary cylinder 81, a fixed frame 82 to which a CCD (Charged Coupled Device) 85 for carrying out photoelectric conversion is attached by way of a CCD holding frame 89, the intermediate cylinder 83 in which a second lens group 87 and the lens driving apparatus 1 are placed by way of the second lens group frame 75, and the movable frame 84 in which the first lens group 86 is placed. The first lens group 86, the second lens group 87, and the focus lens 10 constitute the taking optical system of the digital camera.

Optical information of an image captured through the lens groups 86, 87 is received by a light-receiving surface 88 and is converted by the CCD 85 into an electric signal, whereby an electric signal pattern is formed. The image formed by this electric signal pattern can be seen through a liquid crystal monitor or the like placed in a digital camera body 90. The focus lens 10 adjusts focus in the taking optical system. The lens barrel 80 in accordance with this embodiment expands and collapses the intermediate cylinder 83 and movable cylinder 84, thereby realizing a zooming function in such a digital camera. Configurations for carrying out these expanding and collapsing operations will now be explained.

The peripheral face of the fixed frame 82 is formed with a cam groove 95. The cam groove 95 penetrates through the peripheral face of the fixed frame 82, and is formed into a spiral along the peripheral face. A cam follower 92 of the intermediate cylinder 83 is inserted in the cam groove 95. The cam follower 92 is a protrusion, formed in the outer peripheral face of the intermediate cylinder 83, projecting from the outer peripheral face to the outside. A pin 93 is attached to the leading end part of the cam follower 92. The pin 93 is inserted in a longitudinal groove 94 formed in the inner peripheral face of the rotary cylinder 81, and transmits the turning force of the rotary cylinder 81 to the intermediate cylinder 83 as the rotary cylinder 81 rotates. The rotary cylinder 81 is a tubular member disposed on the outside of the fixed frame 82, and rotates in response to the driving force of an expanding/collapsing motor (not depicted) which is placed in the digital camera body 90. The longitudinal groove 94 is formed by indenting the inner peripheral face of the rotary cylinder 81, and extends along the optical axis O of the taking optical system.

As the rotary cylinder 81 rotates, the pin 93 and cam follower 92 move not only circumferentially along the cam groove 95 spirally formed in the fixed frame 82, but also along the optical axis O while being guided by the longitudinal groove 94. Consequently, the intermediate cylinder 83 moves along the optical axis O while rotating, thereby expanding or collapsing with respect to the fixed frame 82.

A linearly-advancing key ring 97, which is an annular member having a diameter substantially the same as that of the intermediate cylinder 83, engages the rear end part of the intermediate cylinder 83 so as to be rotatable relative to the intermediate cylinder 83. The inner peripheral face of the fixed frame 82 is formed with a longitudinal groove 96 extending along the optical axis O, whereas the linearly-advancing key ring 97 also fits in the longitudinal groove 96. This fitting prevents the linearly-advancing key ring 97 from rotating. As a consequence, the linearly-advancing key ring 97 moves along the optical axis O together with the intermediate cylinder 83 while in a state not rotating together with the intermediate cylinder 83.

The linearly-advancing key ring 97 is formed with a support part 97a extending forward along the optical axis. The support part 97a engages the rear end part of the movable cylinder 84, thereby preventing the movable cylinder 84 from rotating. The rear end of the movable cylinder 84 is provided with a pin 98 projecting from the outer peripheral face. The pin 98 is inserted in a cam groove 99 formed in the inner peripheral face of the intermediate cylinder 83. The cam groove 99 is formed spirally along the inner peripheral face of the intermediate cylinder 83.

Since the movable cylinder 84 is supported by the support part 97a of the linearly-advancing key ring 97, it does not rotate together with the intermediate cylinder 83 when the latter rotates. As a consequence, the pin 98 rotates relatively with respect to the intermediate cylinder 83 and moves in conformity to the spiral form of the cam groove 99. Therefore, as the intermediate cylinder 83 rotates, the movable cylinder 84 moves along the optical axis O, thereby expanding or collapsing with respect to the intermediate cylinder 83.

In this embodiment, the expanding/collapsing motor and the constituents (cam grooves 95, 99, cam follower 92, pins 93, 98, linearly-advancing key ring 97, etc.) enabling the intermediate cylinder 83 and movable cylinder 84 to expand/collapse in response to the rotation of the expanding/collapsing motor function as moving means. Driving the moving means makes it possible to adjust distances between the lens groups 86, 87 and light-receiving surface 88, thereby realizing a zooming function (while the second lens group 87 and focus lens 10 are movable along the optical axis O relative to the intermediate cylinder 83).

Figure 5:
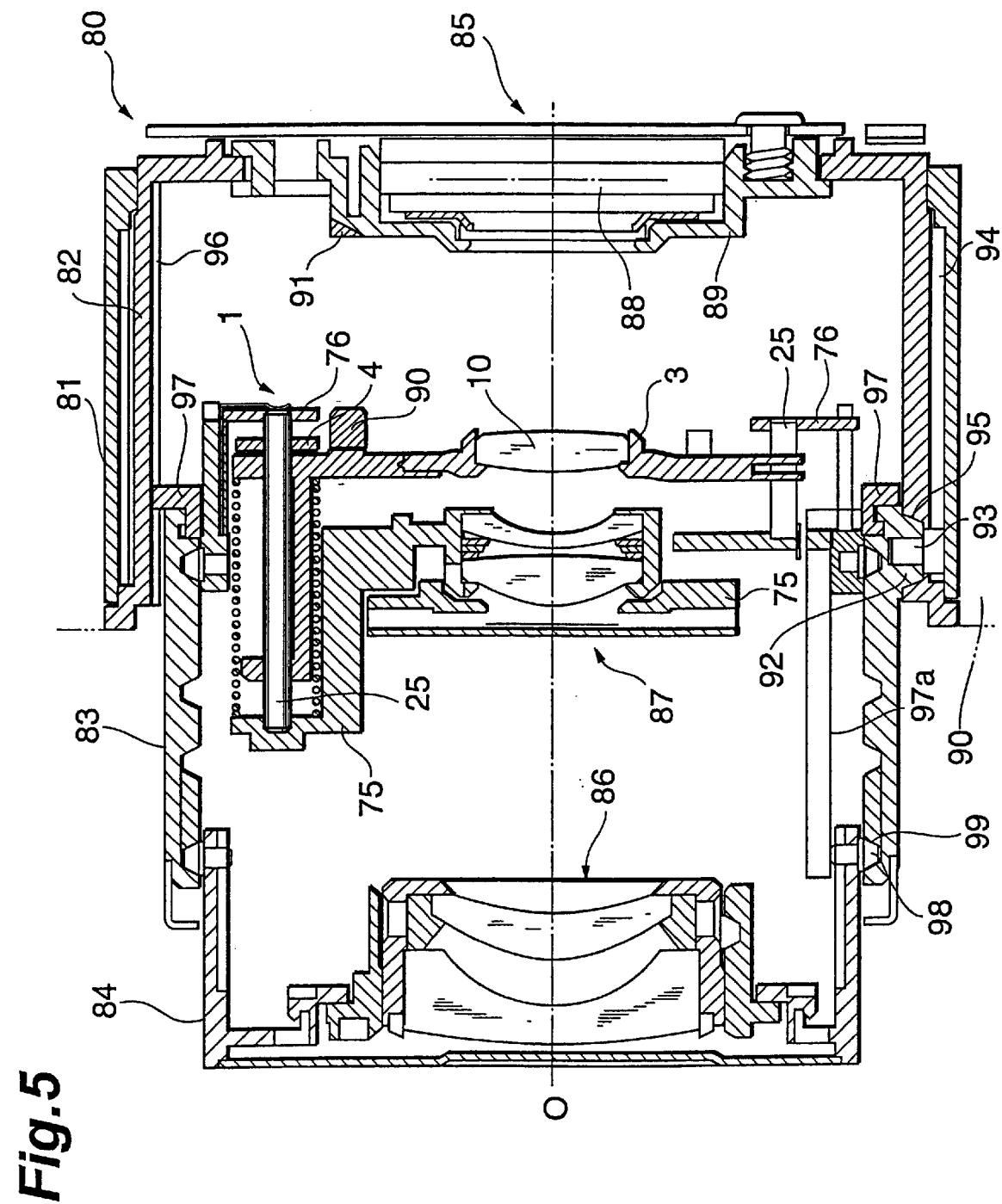
FIG. 5 is a sectional view of a modified example of the lens barrel shown in FIG. 3.

When moving the lens driving apparatus 1 placed in the intermediate cylinder 83 to its accommodating position, the intermediate cylinder 83 and movable cylinder 84 are moved by the moving means along the optical axis O, so as to be collapsed into the fixed frame 82. Here, a separating means 90 for separating the lens holding frame 3 and the nut plate 4 from each other is disposed at a position where the lens holding frame 3 of the lens driving apparatus 1 is accommodated. In this embodiment, the separating means is a boss 90, formed on the CCD holding frame 89, projecting by a predetermined amount along the optical axis O. When the intermediate cylinder 83 and movable cylinder 84 are collapsed into the fixed frame 82, the boss 90 stops the lens holding frame 3 from moving at a predetermined position by abutting against a boss receiving part 91 of the lens holding frame 3, thereby separating it from the nut plate 4 (see FIG. 4). As a consequence, the lens 10 can be stopped at a safe position where it neither collides nor comes into contact with other members. Since the boss 90 separates the lens holding frame 3 from the nut plate 4 by abutting against the boss receiving part 91 of the lens holding frame 3, it can stop the lens 10 rapidly and correctly at a safe position without electric control. Such an effect is realized due to the fact that the lens holding frame 3 and the nut plate 4 are provided separately from each other. Alternatively, as shown in FIG. 5, the lens holding frame 3 may be provided with the boss 90, as the separating means, which is configured so as to abut against the boss receiving part 91 formed on the CCD holding frame 89.

Though the present invention is specifically explained according to its embodiments in the foregoing, the present invention is not limited to the above-mentioned embodiments when being carried out, but includes all the modifications of the invention falling within the scope of claims of the present invention, and can be modified in terms of its form, size, arrangement, configuration, and the like.

For example, though an example in which the lens driving apparatus 1 is applied to a digital camera body is shown, it is also applicable to lens optical systems of cameras for taking photographs by using silver halide films and other optical devices.

What is claimed is:

1. A lens driving apparatus for moving a lens along an optical axis, said lens driving apparatus comprising:
    a lead screw rotated by a driving source;
    a nut plate formed with a threaded part meshing with a threaded part of said lead screw and adapted to move along said optical axis as said lead screw rotates;
    a lens holding frame for holding said lens, abutting against said nut plate while an abutting portion on a surface of at least one of said lens holding frame and said nut plate is movable, and said lens holding frame being slidable with respect to a guide shaft extending along said optical axis; and urging means for urging said lens holding frame against said nut plate.

2. The lens driving apparatus according to claim 1, wherein said threaded part of said nut plate is less than one pitch.

3. The lens driving apparatus according to claim 1, wherein said lens holding frame abuts against said nut plate about said lead screw.

4. The lens driving apparatus according to claim 1, wherein said nut plate has a through hole through which said guide shaft penetrates.

5. The lens driving apparatus according to claim 4, wherein said through hole is a slot.

6. The lens driving apparatus according to claim 1, wherein said lens is a focus lens for adjusting focus in a taking optical system.

7. A lens barrel comprising:

moving means for moving the lens driving apparatus according to claim 1 to an accommodating position along said optical axis; and separating means for separating said lens holding frame from said nut plate at a predetermined position by abutting against said lens holding frame when said lens driving apparatus is moved by said moving means to said accommodating position.

8. The lens barrel according to claim 7, wherein said separating means is a boss, disposed at said accommodating position, projecting by a predetermined amount along said optical axis.

9. The lens barrel according to claim 7, wherein said separating means is a boss, disposed in said lens holding frame, projecting by a predetermined amount along said optical axis.

* * * * *